(12) United States Patent
Kazim (10) Patent No.: US 8,073,739 B2
(45) Date of Patent: Dec. 6, 2011

(54) METHOD AND SYSTEM TO DELIVER A DIGITAL GOOD

(75) Inventor: Eskander Kazim, Los Altos Hills, CA (US)

(73) Assignee: eBay Inc., San Jose, CA (US)

( * ) Notice: Subject to any disclaimer, the term of this patent is extended or adjusted under 35 U.S.C. 154(b) by 2084 days.

(21) Appl. No.: 11/052,653

(22) Filed: Feb. 7, 2005

(65) Prior Publication Data

US 2006/0178942 A1 Aug. 10, 2006

Related U.S. Application Data

(60) Provisional application No. 60/638,670, filed on Dec. 22, 2004.

(51) Int. Cl.
G06Q 30/00 (2006.01)
G06F 21/00 (2006.01)

(52) U.S. Cl. ............................................. 705/26; 705/51

(58) Field of Classification Search ...................... 705/26
See application file for complete search history.

(56) References Cited

U.S. PATENT DOCUMENTS

| | | | |
|---|---|---|---|
| 2002/0178410 A1 | 11/2002 | Haitsma et al. | |
| 2003/0023695 A1* | 1/2003 | Kobata et al. | 709/206 |
| 2003/0115488 A1 | 6/2003 | Kunito et al. | |
| 2003/0212613 A1 | 11/2003 | Sarig | |
| 2004/0073451 A1* | 4/2004 | Maari | 705/1 |
| 2005/0033652 A1* | 2/2005 | Brentano et al. | 705/26 |
| 2005/0131833 A1 | 6/2005 | Martinelli et al. | |

FOREIGN PATENT DOCUMENTS

| | | |
|---|---|---|
| WO | WO-2006069216 A2 | 6/2006 |
| WO | WO-2006069216 A3 | 6/2006 |

OTHER PUBLICATIONS

"International Search Report and Written Opinion for Application No. PCT/US05/46533, date mailed Aug. 9, 2006", 10 Pages.
"European Application Serial No. 05855144.1, Office Action mailed Jul. 20, 2011", 9 pgs.
"Korean Application Serial No. 2007-7015487, Office Action mailed Aug. 4, 2011", 9 pgs.
Hyshim, "The Implementation of TCP/IP Protocol Stack for RTOS", Korean Institute of Information Scientists and Engineers, vol. 29, Issue 2(III), (Oct. 2002), 427-429.

(Continued)

*Primary Examiner* — Fahd Obeid
*Assistant Examiner* — F. Ryan Zeender
(74) *Attorney, Agent, or Firm* — Schwegman, Lundberg & Woessner, P.A.

(57) ABSTRACT

A system to deliver a digital good from a seller to a buyer is disclosed. The system includes an interface to receive a digital goods package from the seller, the digital goods package including the digital good and a buyer identifier. A digital goods database is provided to store the digital goods package, with an identifier extractor being provided to extract the buyer identifier from the digital goods package. The system further includes a notifier to notify the buyer, based on the buyer identifier, that the digital good has been received from the seller and is ready to be collected by the buyer, wherein, after having sent the notification that the digital good is ready to be collected, the system allows the buyer to access and retrieve the digital good.

18 Claims, 8 Drawing Sheets

OTHER PUBLICATIONS

"European Application Serial No. 05855144.1, Office Action mailed Jul. 20, 2011", 9 pgs.

"European Application Serial No. 05855144.1, Response filed Jan. 8, 2010", 6 pgs.

"International Application Serial No. PCT/US2005/046533, International Preliminary Report on Patentability mailed Jun. 26, 2007", 4 pgs.

"International Application Serial No. PCT/US2005/046533, Written Opinion mailed Aug. 9, 2006", 3 pgs.

"Korean Application Serial No. 2007-7015487, Appeal Against Final Rejection mailed Nov. 25, 2009", 51 pgs.

"Korean Application Serial No. 2007-7015487, Decision on Appeal mailed Jul. 25, 2011", 13 pgs.

"Korean Application Serial No. 2007-7015487, Final Office Action mailed Oct. 5, 2009", 9 pgs.

"Korean Application Serial No. 2007-7015487, Office Action mailed Apr. 15, 2009", 8 pgs.

"Korean Application Serial No. 2007-7015487, Response filed Jan. 5, 2009", 33 pgs.

"Korean Application Serial No. 2007-7015487, Response filed Jun. 15, 2009", 22 pgs.

"Korean Application Serial No. 2009-7024592, Office Action mailed Feb. 7, 2011", 2 pgs.

* cited by examiner

METHOD AND SYSTEM TO DELIVER A DIGITAL GOOD

RELATED APPLICATION

The present application claims the priority benefit of U.S. provisional application Ser. No. 60/638,670, filed Dec. 22, 2004 and entitled "METHOD AND SYSTEM TO DELIVER A DIGITAL GOOD", which application is incorporated herein in its entirety.

TECHNICAL FIELD

The present application relates generally to the technical field of digital goods delivery. The term "digital good" refers to any digital document, file or information, and is meant to include but not be limited to music, photographs, text documents and videos.

BACKGROUND

For transactions concerning physical goods, there are typically four parties involved: the seller, the buyer, the payment system, and the delivery mechanism. While physical goods could be exchanged locally without a formal delivery system, the tracking information provided by the delivery system is invaluable for resolving disputes between the buyer and the seller.

With digital goods, the seller could theoretically send the digital good directly to the buyer, either through e-mail, an online server, or in a closed-loop environment. One of the problems with such an arrangement is that there is no objective third party tracking of the consummation of the transaction. Without this information, the buyer is vulnerable to non-delivery, and the seller is vulnerable to fraudulent chargebacks.

SUMMARY

According to one embodiment there is provided a system to deliver a digital good from a seller to a buyer, the system including:
an interface to receive a digital goods package from the seller, the digital goods package including the digital good and a buyer identifier;
a digital goods storage to store the digital goods package;
an identifier extractor to extract the buyer identifier from the digital goods package; and
a notifier to notify the buyer, based on the buyer identifier, that the digital good has been received from the seller and is ready to be collected by the buyer,
wherein, after having sent the notification that the digital good is ready to be collected, the system allows the buyer to access and retrieve the digital good.

According to a further embodiment, there is provided a method of delivering a digital good from a seller to a buyer, the method including:
receiving a digital goods package from the seller, the digital goods package including the digital good and a buyer identifier;
storing the digital goods package;
extracting the buyer identifier from the digital goods package;
notifying the buyer, based on the buyer identifier, that the digital good has been received from the seller and is ready to be collected by the buyer; and
allowing the buyer to access and retrieve the digital good.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system to deliver a digital good from a seller to a buyer are described. In the following description, for purposes of explanation, numerous specific details are set forth in order to provide a thorough understanding of the present invention. It will be evident, however, to one skilled in the art that the present invention may be practiced without these specific details.

Figure 1:
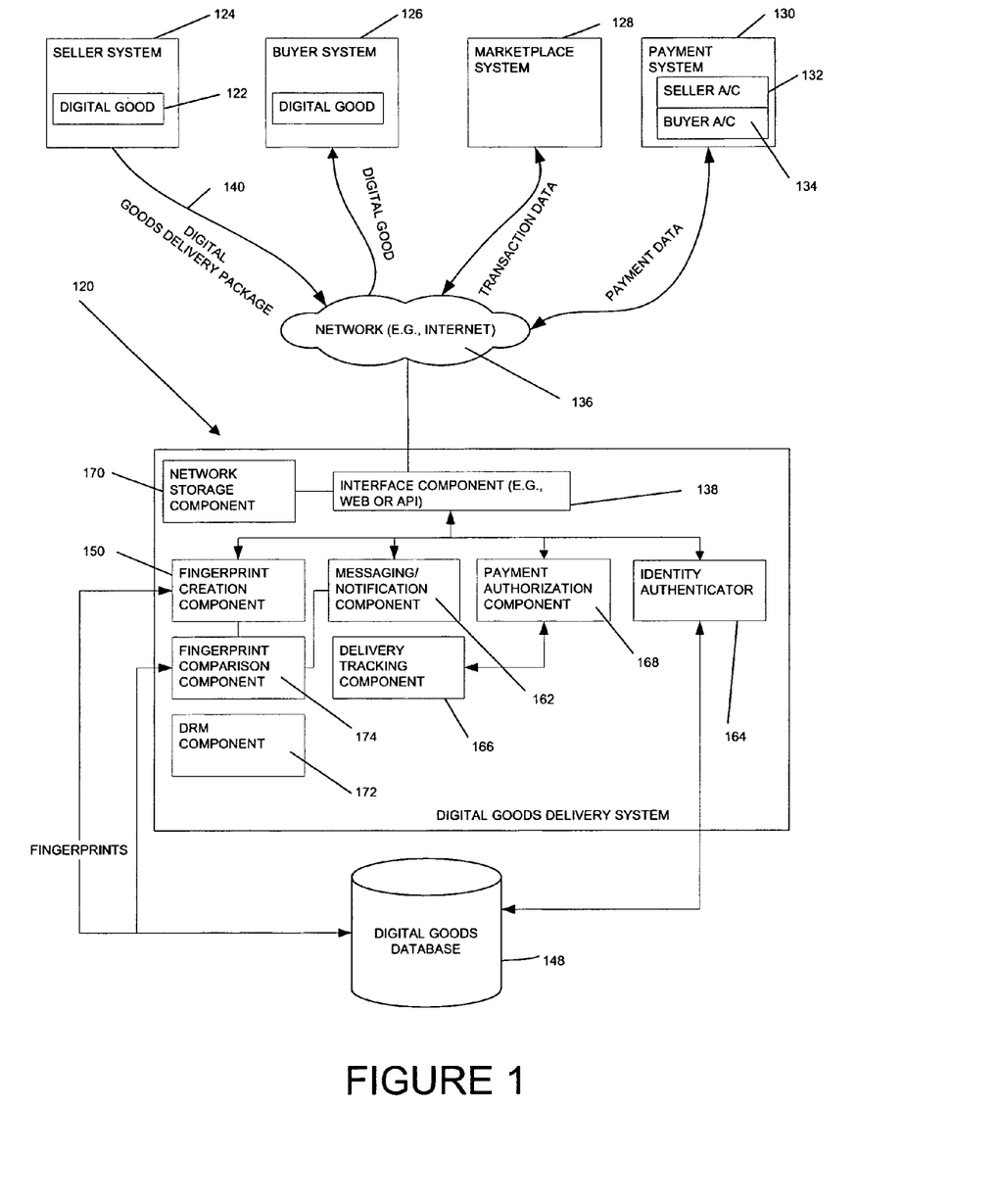
FIG. 1 is a system diagram of a digital goods delivery system of one example embodiment the present invention.

FIG. 1 is a system diagram of a digital goods delivery system 120, according to one example embodiment of the present invention, to deliver a digital good 122 from a seller to a buyer. The seller and the buyer have an associated seller system 124 and a buyer system 126, respectively. A marketplace system 128 may manage the transfer of transaction data between the various parties. A payment system 130 is used to manage the transfer of payment data between the various parties, and comprises a seller account 132 associated with the seller and a buyer account 134 associated with the buyer.

The systems 124, 126, 128 and 130 are in communication with each other and with the digital goods delivery system 120 using a communications network 136, such as the Internet.

Figure 2:
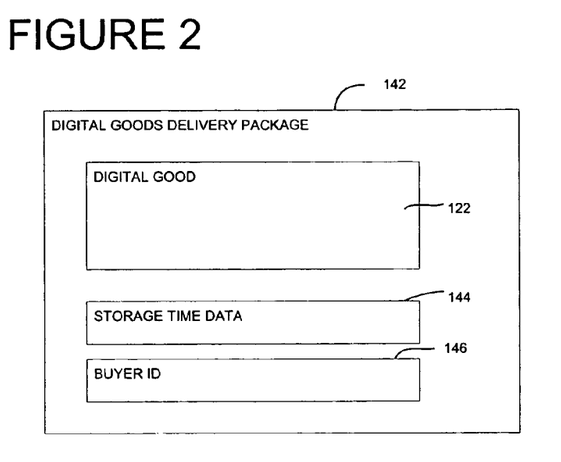
FIG. 2 is a block diagram showing components, according to one example embodiment, of a digital goods delivery package used in the system shown in FIG. 4.

The digital goods delivery system 120 includes an interface 138 to receive a digital goods package from the seller, as indicated by arrow 140. Turning now to FIG. 2, the digital goods package 142 includes, in one example embodiment, the digital good 122, storage time data 144, which will be discussed in more detail further below, and a buyer identifier 146 to enable the system 120 to identify the correct buyer.

Referring back to FIG. 1, the digital goods delivery system 120 further includes a digital goods storage, in the exemplary form of a database 148 to store the digital goods package 142. In a further embodiment, the storage may for example be a file system.

A fingerprint creator 150 is used to create an electronic fingerprint of each digital good received from the seller, the fingerprint being used to identify the digital good. There are a number of ways of generating a digital fingerprint, including checksums and hash algorithms.

In one example version, the fingerprint creator 150 defines an identifier extractor to extract the buyer identifier 146 from the digital goods package 142.

Figure 3:
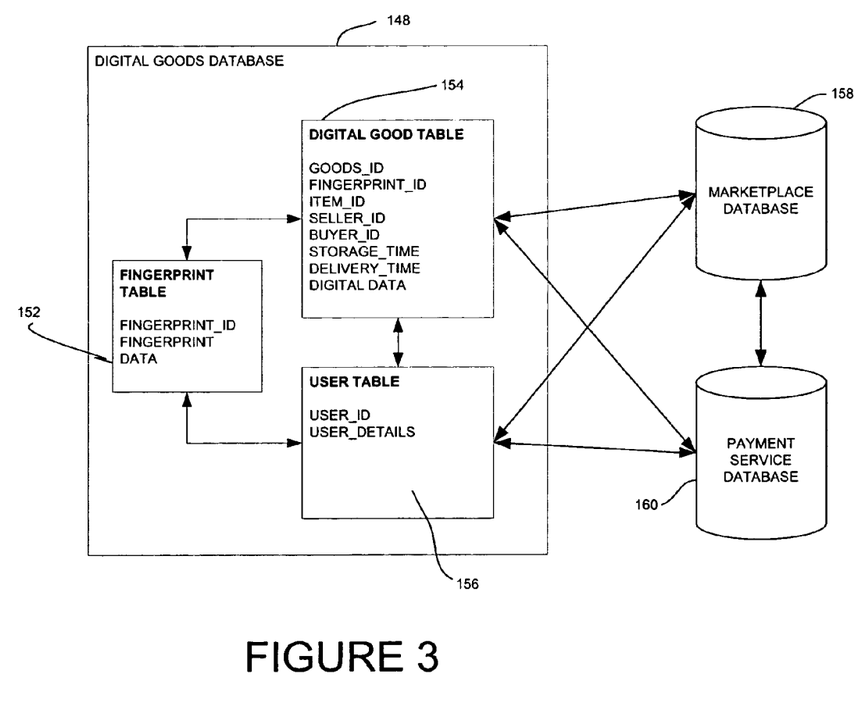
FIG. 3 is a block diagram of a digital goods storage used in the system shown in FIG. 1.

The digital goods database 148 will now be described in more detail with reference to FIG. 3. The database 148 includes a fingerprint table 152, which stores identification data for each electronic fingerprint as well as the actual fingerprint data for the particular digital good. The database 148 further includes a digital good table 154, which not only stores the actual digital good that is being bought by the buyer but also the identification data for each electronic fingerprint, as well as identification data for identifying the actual digital good, the buyer identifier and a seller identifier. The storage time data 144 is also stored in the digital good table 154, this data including the receipt time of the digital good from the seller. The storage time data 144 can also be used by the seller to specify the duration that the digital good is to be stored in the digital goods database 148. A user table 156 is provided to allow a user to access and manipulate the digital goods database 148, with authorized users having an identifier and associated details.

Both the digital good table 154 and the user table 156 can access and utilize a marketplace database 158 associated with the marketplace system 128 and a payment service database 160 associated with the payment system 130.

A notifying component 162 is used to notify the buyer, based on the buyer identifier 146, via the network 136 and associated buyer system 126, that the digital good 122 has been received from the seller and is ready to be collected/downloaded by the buyer. Thus, after having sent the notification that the digital good is ready to be collected, the system 120 allows the buyer to access and retrieve the digital good from the digital goods database 148. In this regard, the system 120 includes an identity authenticator 164 to authenticate that a person wishing to collect a digital good is the correct buyer.

A delivery tracking component 166 is used to track delivery of the digital good to the buyer, with, for example, the time that the digital good is delivered to the buyer being stored in the digital good table 154. Detection of delivery initiates a payment authorization component 168, which is linked to the payment system 130, to carry out the necessary financial transaction between the seller and the buyer.

An optional network storage component 170 can be provided to store the digital good within the system 120.

A digital rights management (DRM) component 172 provides DRM services for the various digital goods being transacted.

The system 120 further includes a fingerprint comparator 174 to compare the fingerprints of two digital goods. This will be used in the event of there being a dispute regarding the delivered digital good, which will be described in detail with reference to FIG. 5.

Figure 4:
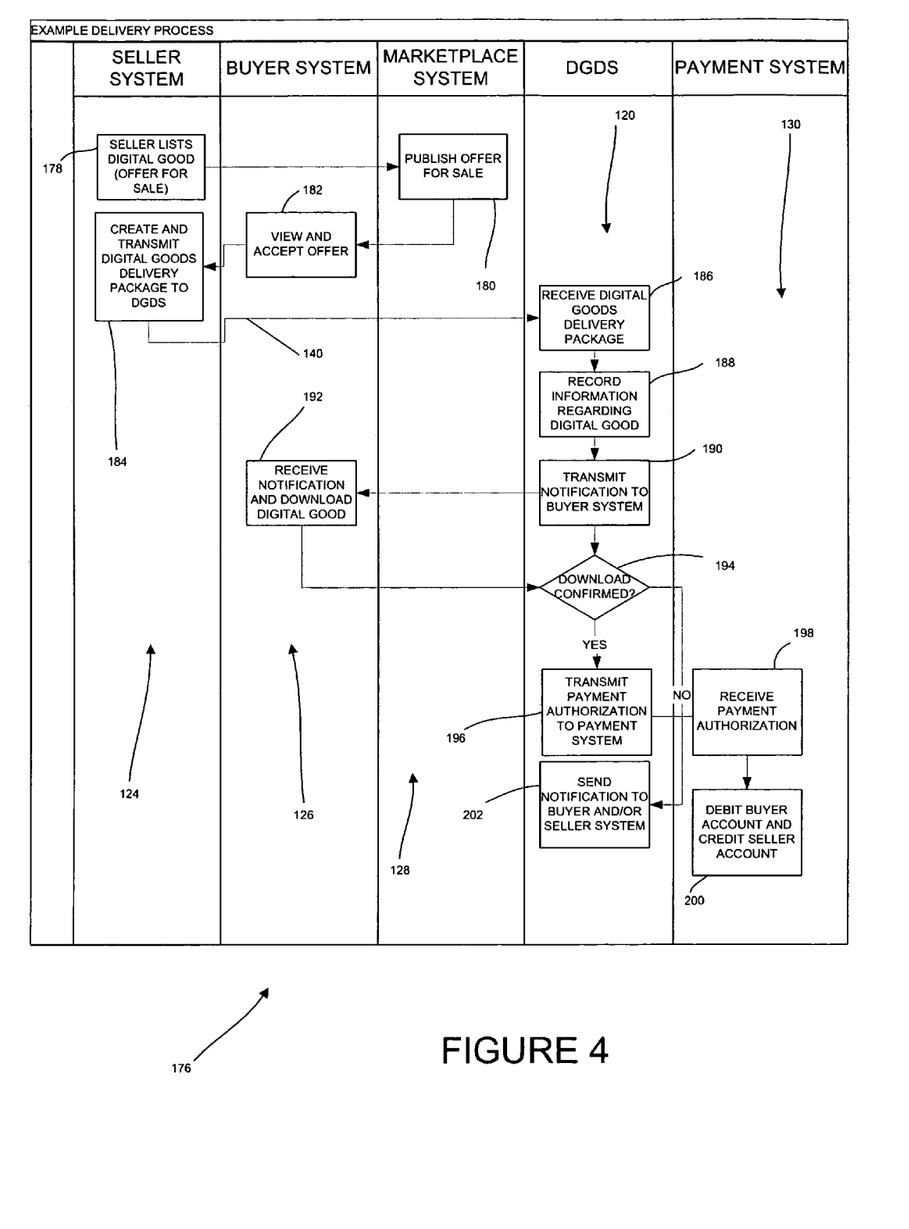
FIG. 4 is a flow diagram of a digital good delivery process according to one example embodiment of the present invention in which there is no dispute regarding the digital good delivered to the buyer.

A digital good delivery process 176, according to an example embodiment the present invention, in which there is no dispute regarding the digital good delivered to the buyer will now be described with reference to FIG. 4. For ease of understanding, the various operations that occur at the seller system 124, the buyer system 126, the marketplace system 128, the digital goods delivery system (DGDS) 120 and the payment system 130 during the delivery process are shown.

The seller first lists the digital good for sale, shown at operation 178, which then gets published by the marketplace system 128 (or some other commerce or publication system) at operation 180. Upon the buyer's acceptance of the offer, at operation 182, the seller system 124, at operation 184, creates and transmits a digital goods delivery package, as described above, to the digital goods delivery system 120, as shown by arrow 140.

Upon receiving the digital goods package from the seller, at operation 186, the digital goods delivery system 120 stores the information regarding the digital good, at operation 188. This operation includes, for example, the creation of a digital fingerprint and extracting the buyer identifier, which have already been described above. A notification is then prepared and sent to the buyer system 126, at operation 190. After the buyer has received and downloaded the digital good, at operation 192, and the download is confirmed by the digital goods delivery system 120 at operation 194, a payment authorization is sent by the system 120 to the payment system 130, at operation 196.

Upon receiving the payment authorization at operation 198, the payment system 130 conducts the necessary financial transaction by debiting the buyer's account and crediting the seller's account, shown at operation 200. If, however, the download is not confirmed by the digital goods delivery system 120, a suitable notification is sent to the buyer and/or seller system, shown at operation 202.

Figure 5:
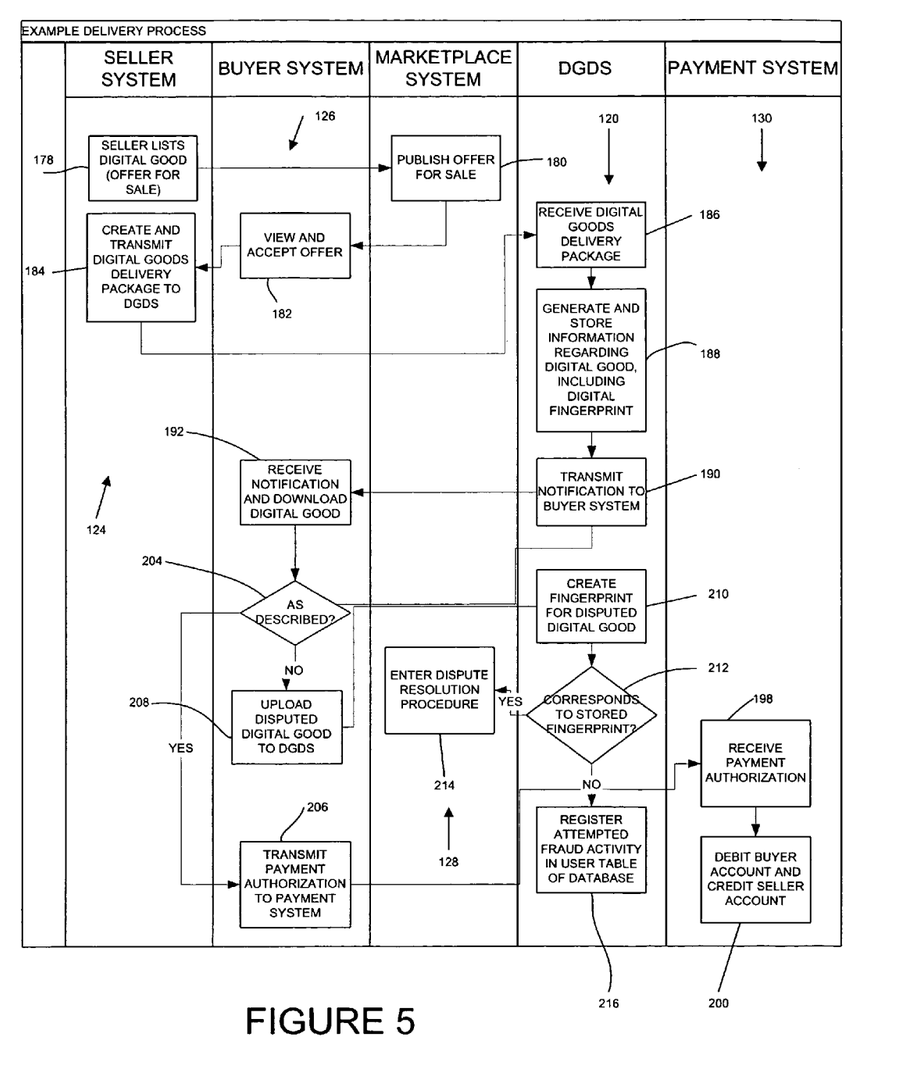
FIG. 5 is a flow diagram of a digital good delivery process according to one example embodiment of the present invention in which there is a dispute regarding the digital good delivered to the buyer.

In the event of there being a dispute regarding the digital good delivered to the buyer, and referring now to FIG. 5, operations 178, 180, 182, 184, 186, 188, 190 and 192 would still take place as described above. FIG. 5 does illustrate an alternative way in which payment can be made in the event of there not being a dispute. This alternative way comprises the buyer confirming that the delivered digital good is as described, at operation 204, with the buyer then him- or herself transmitting a payment authorization to the payment system 130, as shown by operation 206. The operations 198 and 200 would then take place as described above with reference to FIG. 4.

However, in the event of the buyer indicating that the delivered digital good is not as described, at operation 204, the buyer will need to upload the delivered digital good back to the digital goods delivery system 120, at operation 208. The digital goods delivery system 120 will then create a digital fingerprint of the disputed, allegedly incorrect delivered digital good, indicated by operation 210. The digital goods delivery system 120, using the fingerprint comparison component 174 shown in FIG. 1, can then compare the digital fingerprint of the disputed digital good with the digital fingerprint of the digital good that was actually delivered to the buyer, which would have been stored in digital good table 154 of the digital goods database 148, as shown by operation 212.

Should the two digital fingerprints match, then a genuine dispute is recognized and a dispute resolution procedure can be entered into, as shown by operation 214. For example, matching fingerprints indicate that the digital good that the buyer is disputing is the same digital good that was delivered to the buyer via the digital good delivery system 120.

In one embodiment, the digital goods delivery system 120 may itself included a dispute resolution component (not shown). In an alternative embodiment, the dispute resolution procedure may be supported by a dispute resolution mechanism provided external to the digital goods delivery system 120. For example, the marketplace system 128 may provide such a dispute resolution mechanism (e.g., the dispute resolution applications 366 discussed below with reference to FIG. 7). The dispute resolution component is to facilitate resolution of a dispute regarding the digital good, and, in one embodiment, to recognize a genuine dispute concerning the digital good if the fingerprint of the digital good in question and corresponds to a fingerprint of a further digital good uploaded to the system as part of a dispute registration.

If, however, the two digital fingerprints do not match, then an attempted fraud activity against the buyer can be logged in the user table 156 of the digital goods database 148, as shown by operation 216.

Platform Architecture

Figure 6:
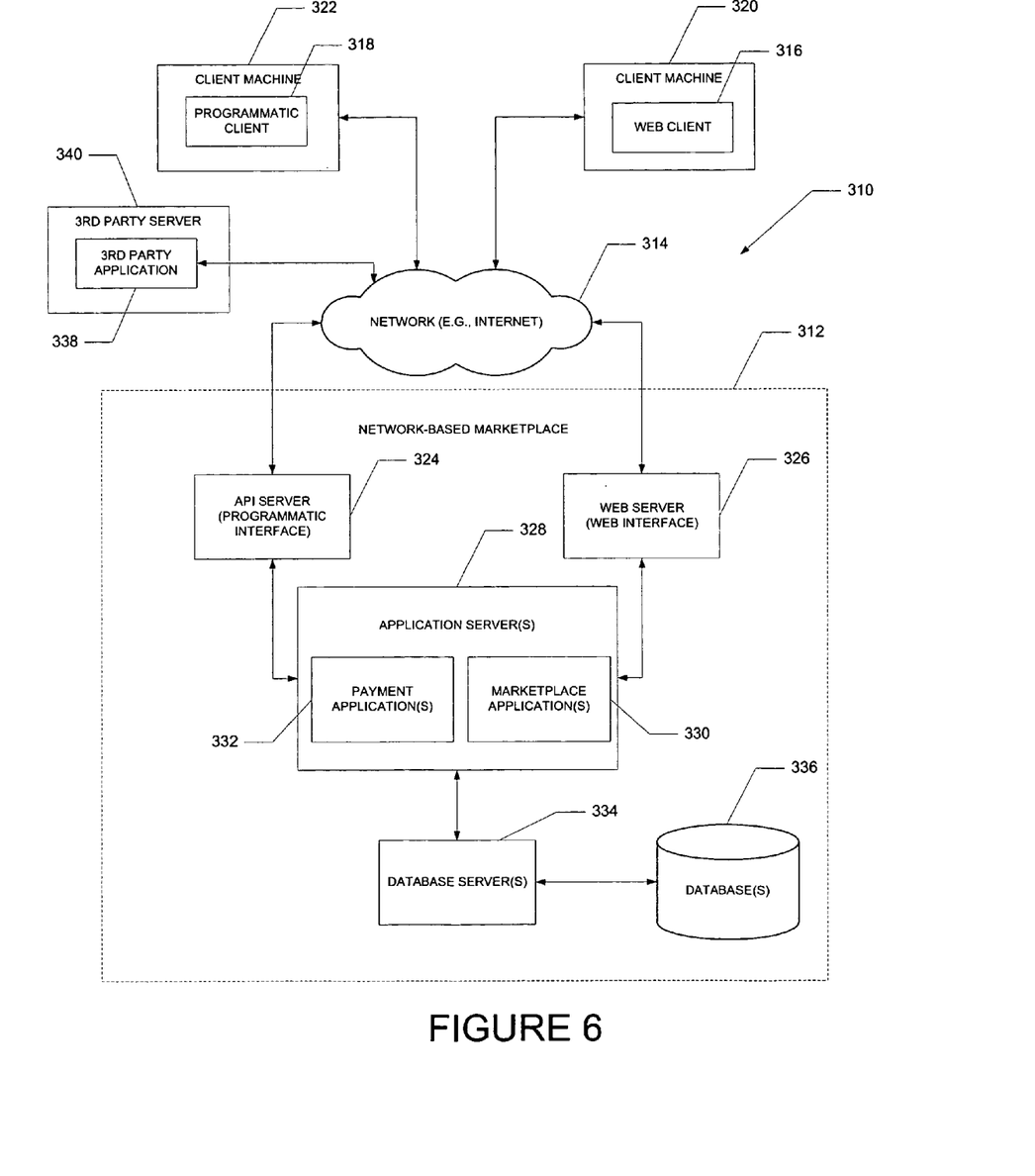
FIG. 6 is a network diagram depicting a system, according to one example embodiment of the present invention.

FIG. 6 is a network diagram depicting a system 310, according to one example embodiment of the present invention, having a client-server architecture. A commerce (or publication) system, in the example form of a network-based marketplace 312, provides server-side functionality, via a network 314 (e.g., the Internet) to one or more clients. FIG. 6 illustrates, for example, a web client 316 (e.g., a browser, such as the Internet Explorer browser developed by Microsoft Corporation of Redmond, Wash. State), and a programmatic client 318 executing on respective client machines 320 and 322.

Turning specifically to the network-based marketplace 312, an Application Program Interface (API) server 324 and a web server 326 are coupled to, and provide programmatic and web interfaces respectively to, one or more application servers 328. The application servers 328 host one or more marketplace applications 330 and payment applications 332. The application servers 328 are, in turn, shown to be coupled to one or more databases servers 334 that facilitate access to one or more databases 336.

The marketplace applications 330 provide a number of marketplace functions and services to users that access the marketplace 312. The payment applications 332 likewise provide a number of payment services and functions to users. The payment applications 330 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 330 and 332 are shown in FIG. 6 to both form part of the network-based marketplace 312, it will be appreciated that, in alternative embodiments of the present invention, the payment applications 332 may form part of a payment service that is separate and distinct from the marketplace 312.

Further, while the system 310 shown in FIG. 6 employs a client-server architecture, the present invention is of course not limited to such an architecture, and could equally well find application in a distributed, or peer-to-peer, architecture system. The various marketplace and payment applications 330 and 332 could also be implemented as standalone software programs, which do not necessarily have networking capabilities.

The web client 316, it will be appreciated, accesses the various marketplace and payment applications 330 and 332 via the web interface supported by the web server 326. Similarly, the programmatic client 318 accesses the various services and functions provided by the marketplace and payment applications 330 and 332 via the programmatic interface provided by the API server 324. The programmatic client 318 may, for example, be a seller application (e.g., the TurboLister application developed by eBay Inc., of San Jose, Calif.) to enable sellers to author and manage listings on the marketplace 312 in an off-line manner, and to perform batch-mode communications between the programmatic client 318 and the network-based marketplace 312.

FIG. 6 also illustrates a third party application 338, executing on a third party server machine 340, as having programmatic access to the network-based marketplace 312 via the programmatic interface provided by the API server 324. For example, the third party application 338 may, utilizing information retrieved from the network-based marketplace 312, support one or more features or functions on a website hosted by the third party. The third party website may, for example, provide one or more promotional, marketplace or payment functions that are supported by the relevant applications of the network-based marketplace 312.

Marketplace Applications

Figure 7:
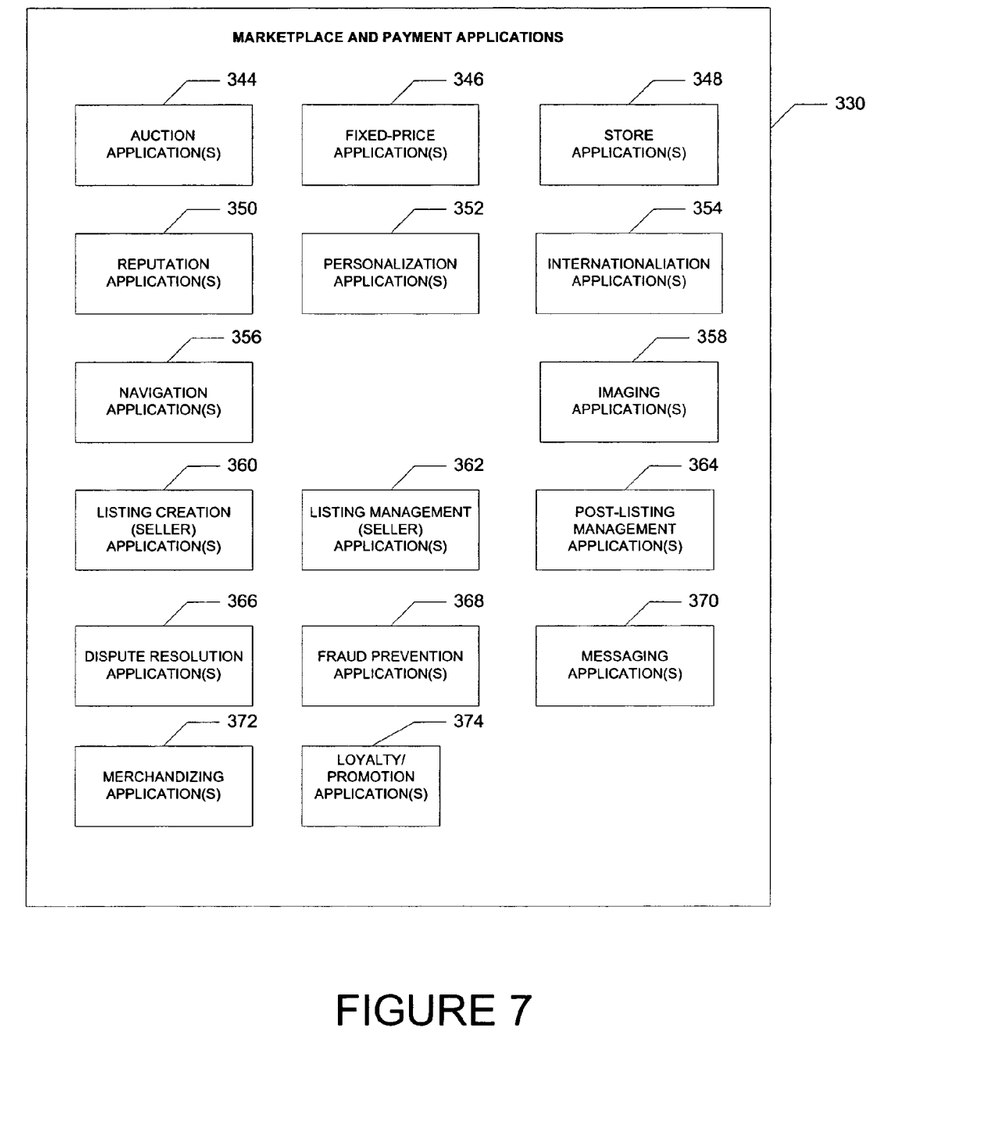
FIG. 7 is a block diagram illustrating multiple marketplace and payment applications.

FIG. 7 is a block diagram illustrating multiple marketplace and payment applications 330 that, in one example embodiment of the present invention, are provided as part of the network-based marketplace 312. The marketplace 312 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 30 are shown to include one or more auction applications 344 which support auction-format listing and price setting mechanisms (e.g., English, Dutch, Vickrey, Chinese, Double, Reverse auctions etc.). The various auction applications 344 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 346 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 348 allow sellers to group their listings within a "virtual" store, which may be branded and otherwise personalized by and for the sellers. Such a virtual store may also offer promotions, incentives and features that are specific and personalized to a relevant seller.

Reputation applications 350 allow parties that transact utilizing the network-based marketplace 312 to establish, build and maintain reputations, which may be made available and published to potential trading partners. Consider that where, for example, the network-based marketplace 312 supports person-to-person trading, users may have no history or other reference information whereby the trustworthiness and credibility of potential trading partners may be assessed. The reputation applications 350 allow a user, for example through feedback provided by other transaction partners, to establish a reputation within the network-based marketplace 312 over time. Other potential trading partners may then reference such a reputation for the purposes of assessing credibility and trustworthiness.

Personalization applications 352 allow users of the marketplace 312 to personalize various aspects of their interactions with the marketplace 312. For example a user may, utilizing an appropriate personalization application 352, create a personalized reference page at which information regarding transactions to which the user is (or has been) a party may be viewed. Further, a personalization application 352 may enable a user to personalize listings and other aspects of their interactions with the marketplace 312 and other parties.

In one embodiment, the network-based marketplace 312 may support a number of marketplaces that are customized, for example, for specific geographic regions. A version of the marketplace 312 may be customized for the United Kingdom, whereas another version of the marketplace 312 may be customized for the United States. Each of these versions may operate as an independent marketplace, or may be customized (or internationalized) presentations of a common underlying marketplace.

Navigation of the network-based marketplace 312 may be facilitated by one or more navigation applications 356. For example, a search application enables key word searches of listings published via the marketplace 312. A browse application allows users to browse various category, catalogue, or inventory data structures according to which listings may be classified within the marketplace 312. Various other navigation applications may be provided to supplement the search and browsing applications.

In order to make listings, available via the network-based marketplace 312, as visually informing and attractive as possible, the marketplace applications 330 may include one or more imaging applications 358 utilizing which users may upload images for inclusion within listings. An imaging application 358 also operates to incorporate images within viewed listings. The imaging applications 358 may also support one or more promotional features, such as image galleries that are presented to potential buyers. For example, sellers may pay an additional fee to have an image included within a gallery of images for promoted items.

Listing creation applications 360 allow sellers conveniently to author listings pertaining to goods or services that they wish to transact via the marketplace 312, and listing management applications 362 allow sellers to manage such listings. Specifically, where a particular seller has authored and/or published a large number of listings, the management of such listings may present a challenge. The listing management applications 362 provide a number of features (e.g., auto-relisting, inventory level monitors, etc.) to assist the seller in managing such listings. One or more post-listing management applications 64 also assist sellers with a number of activities that typically occur post-listing. For example, upon completion of an auction facilitated by one or more auction applications 344, a seller may wish to leave feedback regarding a particular buyer. To this end, a post-listing management application 364 may provide an interface to one or more reputation applications 350, so as to allow the seller conveniently to provide feedback regarding multiple buyers to the reputation applications 350.

Dispute resolution applications 366 provide mechanisms whereby disputes arising between transacting parties may be resolved. For example, the dispute resolution applications 366 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 368 implement various fraud detection and prevention mechanisms to reduce the occurrence of fraud within the marketplace 312.

Messaging applications 370 are responsible for the generation and delivery of messages to users of the network-based marketplace 312, such messages for example advising users regarding the status of listings at the marketplace 312 (e.g., providing "outbid" notices to bidders during an auction process or to provide promotional and merchandising information to users).

Merchandising applications 372 support various merchandising functions that are made available to sellers to enable sellers to increase sales via the marketplace 312. The merchandising applications 380 also operate the various merchandising features that may be invoked by sellers, and may monitor and track the success of merchandising strategies employed by sellers.

The network-based marketplace 312 itself, or one or more parties that transact via the marketplace 312, may operate loyalty programs that are supported by one or more loyalty/promotions applications 374. For example, a buyer may earn loyalty or promotions points for each transaction established and/or concluded with a particular seller, and be offered a reward for which accumulated loyalty points can be redeemed.

Data Structures

Figure 8:
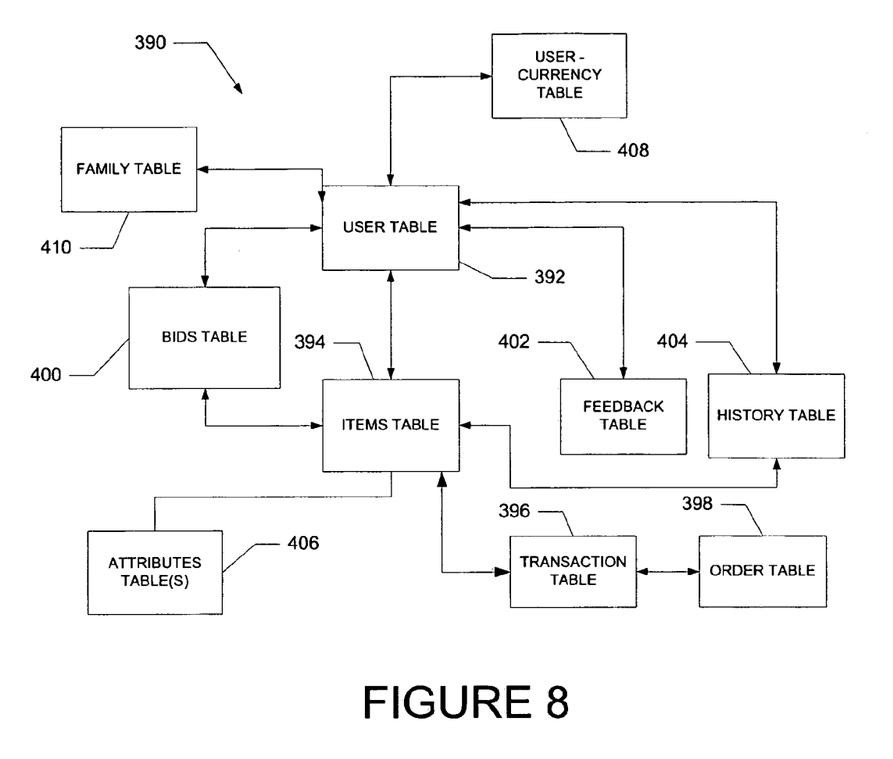
FIG. 8 is a high-level entity-relationship diagram.

FIG. 8 is a high-level entity-relationship diagram, illustrating various tables 390 that may be maintained within the databases 336, and that are utilized by and support the marketplace and payment applications 330 and 332. A user table 392 contains a record for each registered user of the network-based marketplace 312, and may include identifier, address and financial instrument information pertaining to each such registered user. A user may, it will be appreciated, operate as a seller, a buyer, or both, within the network-based marketplace 312. In one example embodiment of the present invention, a buyer may be a user that has accumulated value (e.g., commercial or proprietary currency), and is then able to exchange the accumulated value for items that are offered for sale by the network-based marketplace 312.

The tables 390 also include an items table 394 in which are maintained item records for goods and services that are available to be, or have been, transacted via the marketplace 312. Each item record within the items table 394 may furthermore be linked to one or more user records within the user table 392, so as to associate a seller and one or more actual or potential buyers with each item record.

A transaction table 396 contains a record for each transaction (e.g., a purchase transaction) pertaining to items for which records exist within the items table 394.

An order table 398 is populated with order records, each order record being associated with an order. Each order, in turn, may be with respect to one or more transactions for which records exist within the transactions table 396.

Bid records within a bids table 400 each relate to a bid received at the network-based marketplace 312 in connection with an auction-format listing supported by an auction application 344. A feedback table 402 is utilized by one or more reputation applications 350, in one example embodiment, to construct and maintain reputation information concerning users. A history table 404 maintains a history of transactions to which a user has been a party. One or more attributes tables 406 record attribute information pertaining to items for which records exist within the items table 394. Considering only a single example of such an attribute, the attributes tables 406 may indicate a currency attribute associated with a particular item, the currency attribute identifying the currency of a price for the relevant item as specified in by a seller.

Figure 9:
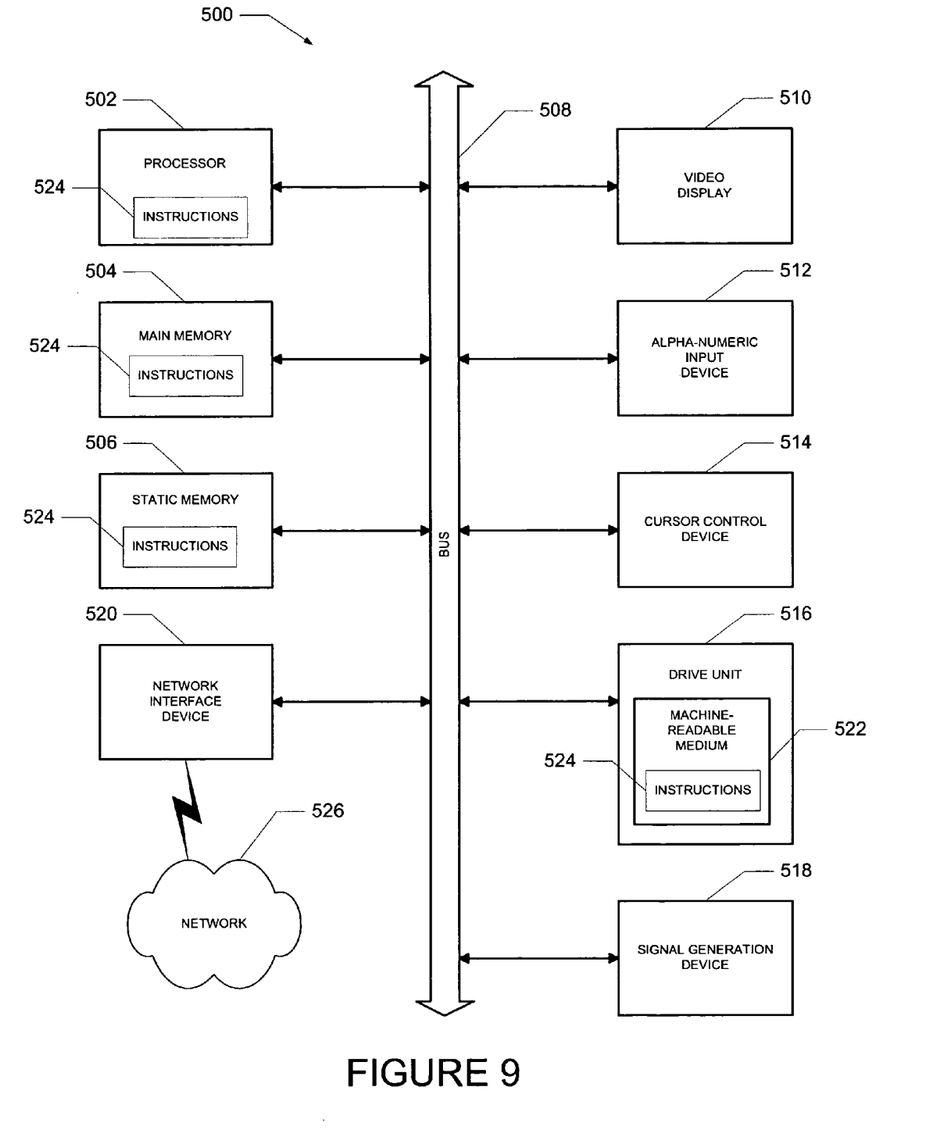
FIG. 9 shows a diagrammatic representation of a machine for performing any one or more of the operations described herein.

FIG. 9 shows a diagrammatic representation of machine in the example form of a computer system 500 within which a set of instructions, for causing the machine to perform any one or more of the methodologies discussed herein, may be executed. In alternative embodiments, the machine operates as a standalone device or may be connected (e.g., networked)

to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU) a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions (e.g., software 524) embodying any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to deliver a digital good from a seller to a buyer have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system to deliver a digital good from a seller to a buyer, the system including:
   an interface to receive a digital goods package from the seller, the digital goods package including the digital good and a buyer identifier;
   digital goods storage to store the digital goods package;
   an identifier extractor to extract the buyer identifier from the digital goods package; and
   a notifier to notify the buyer, based on the buyer identifier, that the digital good has been received from the seller and is ready to be collected by the buyer,
   wherein, after having sent the notification that the digital good is ready to be collected, the system allows the buyer to access and retrieve the digital good.

2. The system according to claim 1, wherein the system further includes a fingerprint creator to create an electronic fingerprint of the digital good to identify the digital good.

3. The system according to claim 1, wherein the system further includes a time data storage to store a receipt time of the digital good from the seller and a delivery time of the digital good to the buyer.

4. The system according to claim 1, wherein the digital goods package includes a duration that the digital goods package is to be stored on the digital goods storage.

5. The system according to claim 2, wherein the system further includes a fingerprint comparator to compare the fingerprints of two digital goods.

6. The system according to claim 5, further including a dispute resolution component to facilitate resolution of a dispute regarding the digital good, the dispute resolution component to recognize a genuine dispute concerning the digital good if the fingerprint of the digital good corresponds to a fingerprint of a further digital good uploaded to the system as part of a dispute registration.

7. The system according to claim 1, wherein the system further includes an identity authenticator to authenticate an identity of the buyer before allowing the buyer to access and retrieve the digital good.

8. A computer-implemented method of delivering a digital good from a seller to a buyer, the method including:
   receiving a digital goods package from the seller, the digital goods package including the digital good and a buyer identifier;
   storing the digital goods package in a digital goods storage;
   extracting, using a processor, the buyer identifier from the digital goods package;
   notifying the buyer, based on the buyer identifier and by way of an electronic message, that the digital good has been received from the seller and is ready to be collected by the buyer; and
   allowing the buyer to access and retrieve the digital good.

9. The computer-implemented method according to claim 8, wherein the method further includes creating an electronic fingerprint of the digital good to identify the digital good.

10. The computer-implemented method according to claim 8, wherein the method further includes storing the receipt time of the digital good from the seller and the delivery time of the digital good to the buyer.

11. The computer-implemented method according to claim 8, wherein method includes storing the digital goods package for a predetermined period of time.

12. The computer-implemented method according to claim 8 wherein the method includes authenticating that a person wishing to collect a digital good is the correct buyer.

13. The computer-implemented method according to claim 8, further including recognizing a genuine dispute concerning the digital good if a fingerprint of the digital good corresponds to a fingerprint of a further digital good uploaded to the system as part of a dispute registration.

14. A system to deliver a digital good from a seller to a buyer, the system including:
   means for receiving a digital goods package from the seller, the digital goods package including the digital good and a buyer identifier;

means for storing the digital goods package;

means for extracting the buyer identifier from the digital goods package; and means for notifying the buyer, based on the buyer identifier, that the digital good has been received from the seller and is ready to be collected by the buyer, wherein, after having sent the notification that the digital good is ready to be collected, the system allows the buyer to access and retrieve the digital good.

15. The system according to claim 14 wherein the system further includes means for creating an electronic fingerprint of the digital good to identify the digital good.

16. The system according to claim 14, wherein the system further includes means for storing the receipt time of the digital good from the seller and the delivery time of the digital good to the buyer.

17. The system according to claim 15, wherein the system further includes means for comparing the electronic fingerprints of two digital goods.

18. The system according to claim 14, wherein the system further means for authenticating that a person wishing to collect a digital good is the correct buyer.

* * * * *

UNITED STATES PATENT AND TRADEMARK OFFICE
CERTIFICATE OF CORRECTION

| | | |
|---|---|---|
| PATENT NO. | : 8,073,739 B2 | Page 1 of 1 |
| APPLICATION NO. | : 11/052653 | |
| DATED | : December 6, 2011 | |
| INVENTOR(S) | : Kazim | |

It is certified that error appears in the above-identified patent and that said Letters Patent is hereby corrected as shown below:

In Drawings

On Sheet 6 of 8, Box No. 354, Figure 7, line 1, delete "INTERNATIONALIATION" and insert -- INTERNATIONALIZATION --, therefor.

In column 12, line 9, in Claim 18, delete "further" and insert -- further includes --, therefor.

Signed and Sealed this
Twenty-first Day of February, 2012

David J. Kappos
*Director of the United States Patent and Trademark Office*